United States Patent
Petersen et al.

(10) Patent No.: US 11,014,202 B1
(45) Date of Patent: May 25, 2021

(54) COATING APPLICATOR TOOL AND METHOD FOR REPAIRING LEADING EDGE DAMAGE ON A WIND TURBINE BLADE

(71) Applicant: Vestas Wind Systems A/S, Aarhus N. (DK)

(72) Inventors: Aksel Petersen, Rinkøbing (DK); Claus Engholm Nielsen, Ringkøbing (DK); Lean Frandsen, Holstebro (DK); Anders Tuxen, Risskov (DK); Ivar J. B. K. Jensen, Hornslet (DK)

(73) Assignee: Vestas Wind Systems A/S, Aarhus N. (DK)

( * ) Notice: Subject to any disclaimer, the term of this patent is extended or adjusted under 35 U.S.C. 154(b) by 0 days.

(21) Appl. No.: 17/156,716

(22) Filed: Jan. 25, 2021

(30) Foreign Application Priority Data

Jan. 27, 2020 (DK) .......................... PA 2020 70050

(51) Int. Cl.
  *B23P 6/00* (2006.01)
  *F03D 80/50* (2016.01)
  *F03D 80/00* (2016.01)

(52) U.S. Cl.
  CPC .............. *B23P 6/007* (2013.01); *F03D 80/00* (2016.05); *F05B 2230/80* (2013.01); *F05B 2230/90* (2013.01)

(58) Field of Classification Search
  CPC ...... F03D 80/00; F03D 80/50; F05B 2230/80; F05B 2230/90; F05B 2230/608; B23P 6/007; B23P 6/002; B23P 6/00
  See application file for complete search history.

(56) References Cited

U.S. PATENT DOCUMENTS

| | | | |
|---|---|---|---|
| 2,804,767 A | 9/1957 | Schoen | |
| 3,341,878 A * | 9/1967 | Hubbard | ................. B25B 33/00 15/235.4 |
| 5,908,522 A * | 6/1999 | Lofstrom | .............. B64C 11/205 156/94 |
| 9,664,201 B2 * | 5/2017 | Dudon | .................... C23C 24/04 |

(Continued)

FOREIGN PATENT DOCUMENTS

| | | |
|---|---|---|
| EP | 3211216 A1 | 8/2017 |
| WO | 2008157013 A1 | 12/2008 |
| WO | 2019068299 A1 | 4/2019 |

OTHER PUBLICATIONS

Danish Patent and Trademark Office, Search and Examination Report in PA 2020 70050, dated Aug. 21, 2020.

*Primary Examiner* — Igor Kershteyn
*Assistant Examiner* — Joshua R Beebe
(74) *Attorney, Agent, or Firm* — Wood Herron & Evans LLP

(57) ABSTRACT

An applicator tool (40) for repairing damage (26) to a wind turbine blade (20) includes a spatula (42) including a flexible extrusion plate (44) and one or more spacers (60, 106) positioned proximate an inner surface (58) of the extrusion plate (44). The one or more spacers (60, 106) are configured to define a gap between an outer surface (34) of the wind turbine blade (20) and the inner surface (58) of the extrusion plate (44). A feed tube (86) is provided for supplying a coating material to the spatula (42), wherein the spatula (42) is configured to shape the coating material into a coating (30) over a damaged area (26) of the wind turbine blade (20).

24 Claims, 15 Drawing Sheets

(56) References Cited

U.S. PATENT DOCUMENTS

| | | | |
|---|---|---|---|
| 2008/0159870 A1* | 7/2008 | Hong | F04D 29/644 416/224 |
| 2011/0158807 A1* | 6/2011 | Hong | B23P 6/007 416/61 |
| 2012/0156049 A1* | 6/2012 | Hong | B23P 6/007 416/224 |
| 2014/0154089 A1* | 6/2014 | Traser | C09J 5/08 416/224 |

* cited by examiner

COATING APPLICATOR TOOL AND METHOD FOR REPAIRING LEADING EDGE DAMAGE ON A WIND TURBINE BLADE

TECHNICAL FIELD

This application relates generally to wind turbines, and more particularly to an applicator tool and method for repairing damage along the leading edge of a wind turbine blade without necessitating removal of the blade from the wind turbine.

BACKGROUND

Wind turbines are used to produce electrical energy using a renewable resource and without combusting a fossil fuel. Generally, a wind turbine converts kinetic energy from the wind into electrical power. A conventional wind turbine installation includes a foundation, a tower supported by the foundation, and an energy generating unit positioned atop of the tower. The energy generating unit typically includes one or more nacelles to house several mechanical and electrical components, such as a generator, gearbox, and main bearing, and the wind turbine also includes a rotor operatively coupled to the components in the nacelle through a main shaft extending from the nacelle. Single rotor wind turbines and multi-rotor wind turbines (which may have multiple nacelles) are known, but for the sake of efficiency, the following description refers primarily to single rotor designs. The rotor, in turn, includes a central hub and a plurality of blades extending radially therefrom and configured to interact with the wind to cause rotation of the rotor. The rotor is supported on the main shaft, which is either directly or indirectly operatively coupled with the generator which is housed inside the nacelle. Consequently, as wind forces the blades to rotate, electrical energy is produced by the generator. Wind power has seen significant growth over the last few decades, with many wind turbine installations being located both on land and offshore.

As noted above, blades interact with the wind to generate mechanical rotation of the rotor, which can then be converted into electrical energy. A wind turbine blade is a complex structure that must be constructed to withstand long-term service in an abusive environment, while also maximizing lift and minimizing drag forces. The blades move at varying speeds through the ambient environment surrounding the wind turbine, but often this movement is at high speed, especially near the tip of the blades. Consequently, the blades will typically experience erosion and damage over time in operation as a result of friction from the air as well as potential impacts from particulate matter, debris, or other items in the air, especially along the leading edge facing the direction of movement through the wind. The erosion or damage along the leading edge of the blade adversely affects the aerodynamic qualities of the blade over time, resulting in lower power production for given incoming wind speeds. Such erosion and damage on the blades can be corrected by routine maintenance and repair procedures.

The blades are typically formed from a shell of layered fibre composite, aluminium, or similar material with an outer skin defined by a series of layers of coatings (polymeric elastomers, paint, etc.) surrounding and covering an outer surface of the shell. The shell encloses internal components of the blade and isolates the internal components from the environment, including shear webs and spar caps, for example. The outer skin may be defined by several different layers of material, including at least an outermost topcoat, a second layer underneath the outermost topcoat, and a third layer underneath the second layer. Other layers are typically present underneath the third layer as well, including base materials typically made from fibre composites and the like. Damage to the blade outer skin can be categorized into several different levels of severity based on which layer the damage extends to, e.g., an erosion to the third layer would be a "category 2" level of severity, which would be higher than a cut to the second layer, which would be a "category 1" level of severity. For low levels of damage or erosion, such damage can be repaired by depositing a coating onto the area to fill in the damage and restore the blade to the original condition along the leading edge thereof.

These types of repairs of the wind turbine blades have typically been conducted in three manners conventionally. First, the blade can be disassembled from the remainder of the wind turbine and lowered to the ground for the repair to be completed. Such a repair process is time-consuming and costly as a result of needing to disassemble, move, and reassemble the blade relative to the top of the tower. Thus, this approach is generally not favoured. In a second approach, a human operator with rope access can rappel along the wind turbine blade while still attached to the rotor hub to evaluate and make repairs as needed to the blade. In a third approach, a repair action can be taken by an operator on a platform hoisted into position adjacent the blade on the wind turbine, either extending from the nacelle or hub of the wind turbine or extending from a cherry picker or boom-style lift. Although the blade may remain attached to the wind turbine in the latter two approaches, a significant amount of skill and time are required to apply and shape the coating to the damaged area of the wind turbine blade properly. If the coating is not properly applied or misshapen, the aerodynamic performance of the blade may be adversely affected, requiring the wind turbine to be taken back out of service and a further maintenance and repair process performed on the blade.

In recent years, a desire has emerged to allow for some automated maintenance of wind turbine blades, to improve the speed and/or precision of such a process. However, such automated maintenance devices are not always designed for reliable use on a wind turbine blade still connected to the rotor and hub of a wind turbine, and such systems are very slow in operation. Furthermore, such systems may be prone to uneven or misshapen coatings similar to that of manual processes. Thus, further improvements for automated maintenance and repair systems are desired.

Accordingly, wind turbine manufacturers and operators continue to seek improved options for conducting maintenance and repair on the wind turbine blades of modern wind turbine designs.

SUMMARY

An applicator tool for repairing damage to a wind turbine blade is disclosed. The applicator tool includes a spatula including a flexible extrusion plate and one or more spacers positioned proximate the inner surface of the extrusion plate. The extrusion plate includes a front edge, a rear edge, opposed side edges, an outer surface, and an inner surface. The extrusion plate further includes a central region defined by a central axis. The one or more spacers are configured to define a gap between an outer surface of the wind turbine blade and the inner surface of the extrusion plate for dispensing of a coating material. The applicator tool further includes a feed tube for supplying the coating material to the spatula. The spatula is configured to shape the coating material into a coating over a damaged area of the wind turbine blade.

The one or more spacers define a height profile that generally corresponds to the shape of the coating from the applicator tool. By way of example, the height profile may have a maximum adjacent the central region of the extrusion plate and decay to substantially zero adjacent the side edges of the extrusion plate. In one embodiment, the extrusion plate may be movable relative to the one or more spacers. For example, the extrusion plate may be slidable relative to the one or more spacers. The relative movement between the extrusion plate and the one or more spacers is configured to vary the height profile.

In one embodiment, the one or more spacers include a plurality of ribs coupled to the inner surface of the extrusion plate and extend from the front edge toward the rear edge, wherein the plurality of ribs defines grooves between adjacent ribs. The plurality of ribs may be integrally formed with the extrusion plate in this embodiment. The plurality of ribs may be positioned on the inner surface of the extrusion plate about the central region and the regions of the inner surface adjacent the side edges may be void of the ribs. In one aspect, a height of the plurality of ribs may vary across the extrusion plate and the plurality of ribs may be symmetric about the central axis. In an exemplary embodiment, the height of the plurality of ribs may be at a maximum adjacent the central region of the extrusion plate and decrease in height away from the central region and toward the side edges.

In another embodiment, the one or more spacers include one or more spines having a front edge, a rear edge, an upper edge, and a lower edge. The lower edge may be angled relative to the upper edge by an acute angle, and the lower edge may be configured to engage the outer surface of the wind turbine blade during use. In this embodiment, the extrusion plate is separate from the one or more spines and is also movable relative to the one or more spines. The one or more spines may be positioned proximate the inner surface of the extrusion plate about the central region and the one or more spines may extend in a direction generally parallel to the central axis. In one embodiment, the extrusion plate may be coupled to a rigid support, the one or more spines may be coupled to the feed tube, and the rigid support may be slidable relative to the feed tube.

In a further embodiment, a method of repairing damage to a wind turbine blade is disclosed. The method includes providing an applicator tool; engaging the applicator tool to the outer surface of the wind turbine blade; supplying the coating material to the applicator tool; moving the applicator tool along the outer surface of the wind turbine blade; and dispensing the coating material from the applicator tool to form the coating over the damaged area of the wind turbine blade.

In one embodiment, the step of engaging the applicator tool may further include engaging the applicator tool to a leading edge of the wind turbine blade. The step of supplying the coating material may further include supplying the coating material to a funnel-shaped space between the outer surface of the wind turbine blade and the inner surface of the extrusion plate. Additionally, the step of moving the applicator tool may include manually moving the applicator tool along the outer surface of the wind turbine blade or moving the applicator tool along the outer surface of the wind turbine blade using a robotic device. In one embodiment, dispensing the coating material may further include dispensing the coating material onto the outer surface of the wind turbine blade in strips, wherein the strips eventually merge together to form the coating.

The applicator tool is configured to dispense the coating material to form a coating having a first profile and the method may further include reconfiguring the applicator tool to dispense the coating material to form a coating having a second profile different from the first profile. In one embodiment, the step of reconfiguring the applicator tool may further include removing the spatula from the applicator tool and inserting another spatula into the applicator tool. The second spatula may have a different height profile that alters the profile of the coating from the applicator tool. In an alternative embodiment, the step of reconfiguring the applicator tool may further include selectively moving the extrusion plate relative to the one or more spacers. This relative movement also alters the profile of the coating from the applicator tool.

The steps and elements described herein can be reconfigured and combined in many different combinations to achieve the desired technical effects in different styles of wind turbines, as may be needed in the art.

BRIEF DESCRIPTION OF THE DRAWINGS

The accompanying drawings, which are incorporated in and constitute a part of this specification, illustrate one or more examples of the invention and, together with a general description of the invention given above, and the detailed description given below, serve to explain the invention.

DETAILED DESCRIPTION

With reference to FIGS. 1 through 16, examples of a coating applicator tool configured to be used with a hand tool or with a robotic maintenance device and a method for repairing damage around a leading edge of a wind turbine blade are shown in detail. The applicator tool for repairing so-called category-1 and category-2 damage to the outer skin of a wind turbine blade includes a spatula for shaping the coating material on the leading edge of the wind turbine blade as the applicator tool is moved along the blade. The spatula is configured to apply a uniform and even coating of material that in cross section is generally thickest adjacent the leading edge of the blade and decreases in thickness in a generally continuous and smooth manner along the upper and lower surfaces of the blade and in a direction toward a trailing edge of the blade. In this way, the coating may smoothly merge with the existing blade surfaces at locations away from the leading edge. The shape of the coating material applied by the applicator tool is configured to repair adequately the damaged area of the blade while also minimizing aerodynamic disruptions of the air flow over the blade. Thus, a repair is achieved with minimal impact on the aerodynamic performance of the blade. A method of using the applicator tool may include scanning the blade to image the damaged area, sanding down a surface of the blade around the damaged area and cleaning the same, and then applying one or more layers of coating with the applicator tool to repair the damage. The spatula and associated method produce a high quality and precise repair of the damaged area of the wind turbine blade that overcomes many of the drawbacks of existing repair devices and processes. Other advantages and effects of the examples of this invention will be evident from the following description.

Throughout this application, the correction of erosion damage on wind turbine blades is typically referred to as a "repair" of those damages. In some contexts, "damage" refers to more significant damages to the blade (perhaps beyond what is described as "category-1" and "category-2" damage herein), and so the operation of the applicator tool may be deemed a routine maintenance action that occurs before a blade is "damaged" in such contexts. In this regard, the applicator tool is capable of providing preventative maintenance to remove wear and erosion effects before such effects cause "damage" that must be repaired on the wind turbine blade, and the applicator tool is also capable of providing more thorough repairs after damage is caused on the blade.

Figure 1:
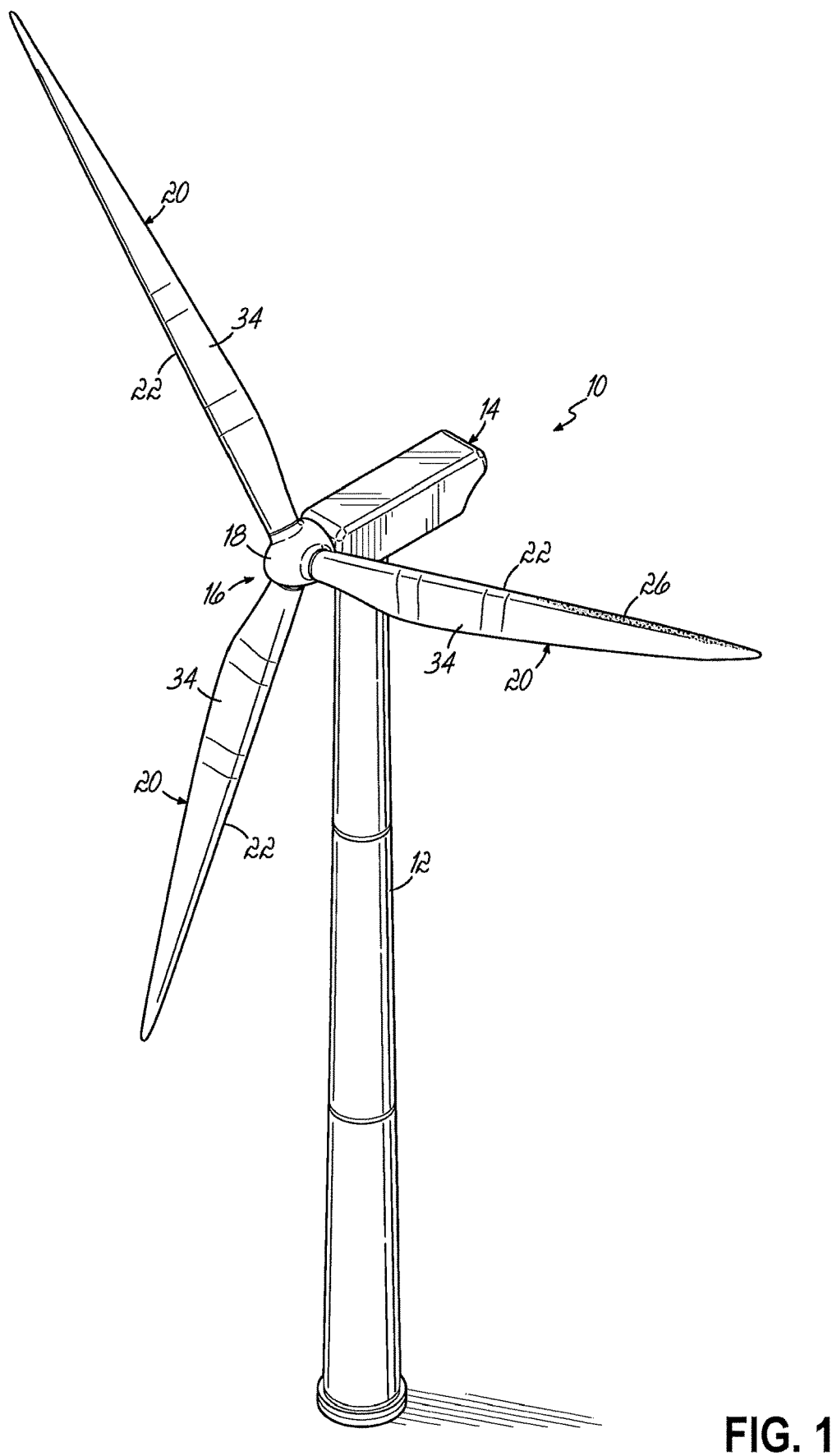
FIG. 1 is a perspective view of a wind turbine.

Turning with reference to FIG. 1, a wind turbine 10 is shown to include a tower 12, a nacelle 14 disposed at the apex of the tower 12, and a rotor 16 operatively coupled to a generator (not shown) housed inside the nacelle 14. The rotor 16 of the wind turbine 10 includes a central hub 18 and a plurality of wind turbine blades 20 that project outwardly from the central hub 18 at locations circumferentially distributed around the hub 18. As shown, the rotor 16 includes three wind turbine blades 20, but the number of blades 20 may vary from one wind turbine to another. The wind turbine blades 20 are configured to interact with air flow to produce lift that causes the rotor 16 to spin generally within a plane defined by the wind turbine blades 20. As the rotor 16 spins, the wind turbine blades 20 pass through the air with a leading edge 22 leading the respective wind turbine blade 20 during rotation. The wind turbine blades 20 in use are spaced apart from the ground surface by a significant distance, which normally renders maintenance and repair actions difficult. However, the coating applicator tool in accordance with examples disclosed herein improves the repair process to make such maintenance and repairs easy and less time-consuming as will be set forth in detail below.

As the wind turbine 10 ages, one or more of the wind turbine blades 20 may experience erosion from prolonged, continuous exposure to the environment. One example of such erosion damage 26 is shown in FIG. 1 and better shown in the detailed view of FIG. 2. While not being particularly limited to any source, erosion damage 26 may occur due to particulates in the air that abrade the leading edge 22 of the wind turbine blade 20 during operation. Erosion therefore may occur in an erosion zone that includes the leading edge 22, but it may also occur in other areas in the surface of the blade 20. Accordingly, while the applicator tool is configured to repair damage and move along the leading edge 22 of the blade 20, this device may also be capable of conducting maintenance and repair actions elsewhere along the outer surface of the blades 20.

Erosion damage 26 is generally characterized as a loss of material from the wind turbine blade 20. Material loss may be uniformly distributed but is often non-uniform across the leading edge 22 or any other surface of the wind turbine blade 20. Rather than losing a uniform skin of material from a surface, erosion may include localized surface imperfections, such as random pitting and shallow gouges or crack-like features that may be a result of localized, connected pitting (as a result of impacts with debris or other matter in the environment). In any case, if erosion damage 26 is not repaired in a timely fashion, the wind turbine blade 20 may become less efficient at rotating the rotor 16 and ultimately, the structural integrity of the wind turbine blade 20 may be significantly impaired.

Figure 2:
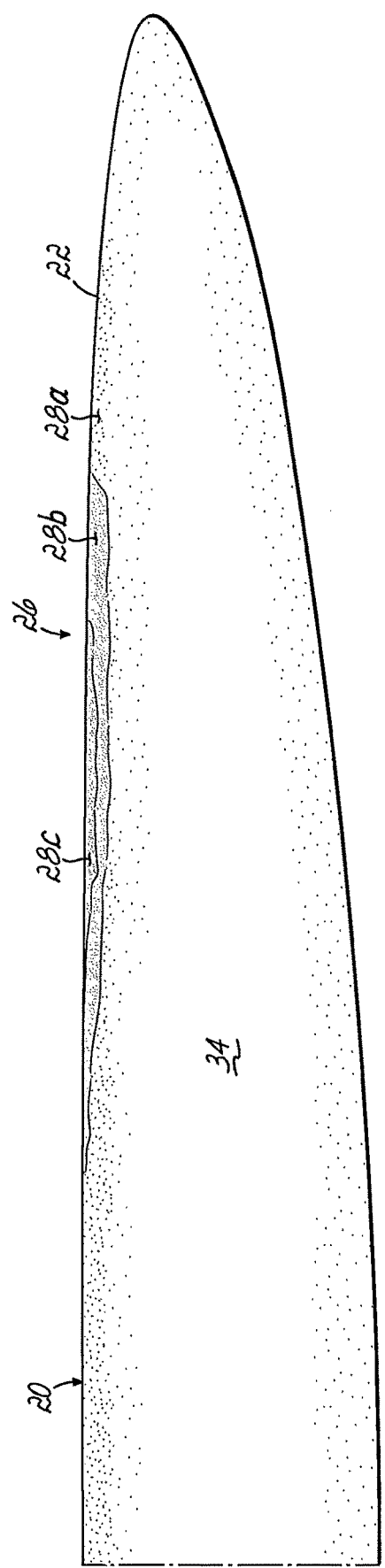
FIG. 2 is a front view of a wind turbine blade of the wind turbine of FIG. 1, showing various levels of erosion-type damage along a leading edge that is pitched upwardly.

With reference to the detailed view in FIG. 2, it will be understood that the erosion damage 26 may define differing levels of severity based on how deep the damage extends inwardly into the material layers defining the outer shell of the blade 20. In the example shown, the erosion damage 26 includes some areas with an erosion or cut of material through the outer topcoat layer into a second layer of material underneath the topcoat, which is categorized as a "category 1" level of severity, and further areas with an erosion or cut of material through the outer topcoat layer and the second later of material into a third layer of material underneath the second layer, which is categorized as a "category 2" level of severity. For reference, deeper cuts and erosions defining more significant damage is typically categorized at higher levels such as category 3, 4, or 5. In FIG. 2, the topcoat is shown at 28a, the revealed areas of second layer are shown at 28b, and the revealed areas of third layer are shown at 28c. By identifying and correcting such lower levels of erosion damage 26 promptly, more significant damage of the blade 20 can be avoided along with higher operational downtime caused by the more significant damage.

Figure 3:
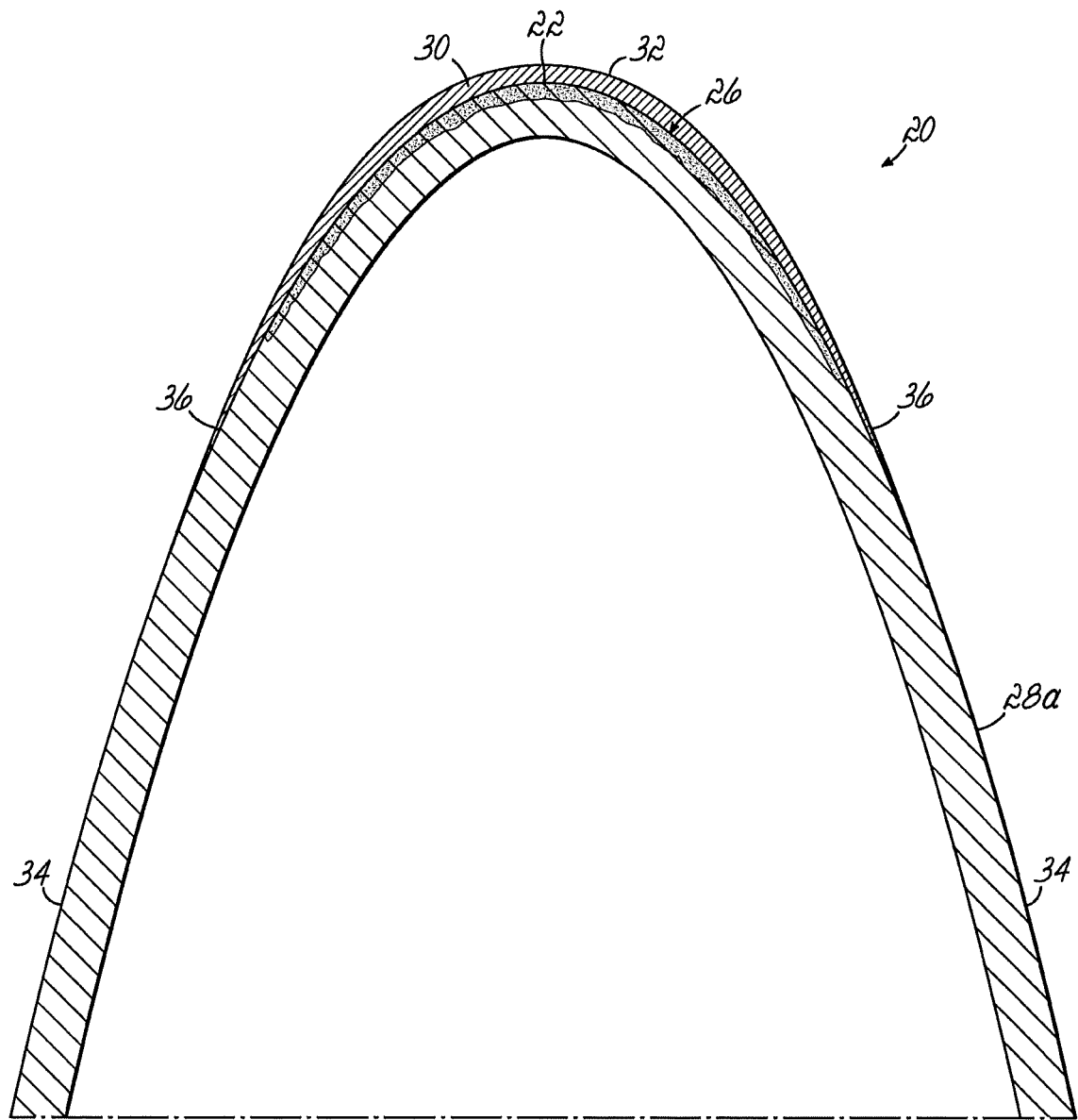
FIG. 3 is a cross-sectional view of the wind turbine blade shown in FIG. 2 with a coating applied over the damaged region on the leading edge of the blade.

FIG. 3 illustrates a repaired section of a wind turbine blade 20 having damage 26 on the leading edge 22 of the blade 20. The repaired section includes a coating 30 of material over the damage 26 on the leading edge 22 of the blade 20. The coating 30 is configured to define a new outer surface 32 that interacts with the air flowing over the blade 20. As such, the coating 30 protects the damage 26 on the wind turbine blade 20 and prevents or reduces the likelihood of the damage 26 further advancing, such as to a higher category of damage. In addition, the coating 30 is preferably shaped so as to minimize any negative impacts of the repair on the aerodynamic performance on the wind turbine blade 20 during use. Thus, the new outer surface 32 is configured to minimize disruptions of the air flow over the blade 20. In this regard and as illustrated in FIG. 3, the coating 30 is configured to be at a maximum thickness at or about the leading edge 22 of the blade 20 and then decrease in thickness in a direction away from the leading edge 22 and toward the trailing edge (not shown) of the blade 20 along both of the outer surfaces 34 (i.e., leeward and windward sides) of the blade 20. Ideally, the thickness of the coating 30 should decay to substantially zero at the outer edges 36 of the coating 30. This allows the coating 30 to merge into the existing surfaces 34 of the blade 20 in a smooth manner, thereby minimizing the disruption of the air flow in the transition from the outer surface 32 of the coating 30 to the original outer surfaces 34 of the blade 20. In an example, the coating 30 may be formed from an epoxy or a polyurethane, but other materials may also be possible. The applicator tool aids in providing a precise and high-quality coating 30 on the leading edge 22 of the wind turbine blade 20 having the shape and features as described above.

Figure 4:
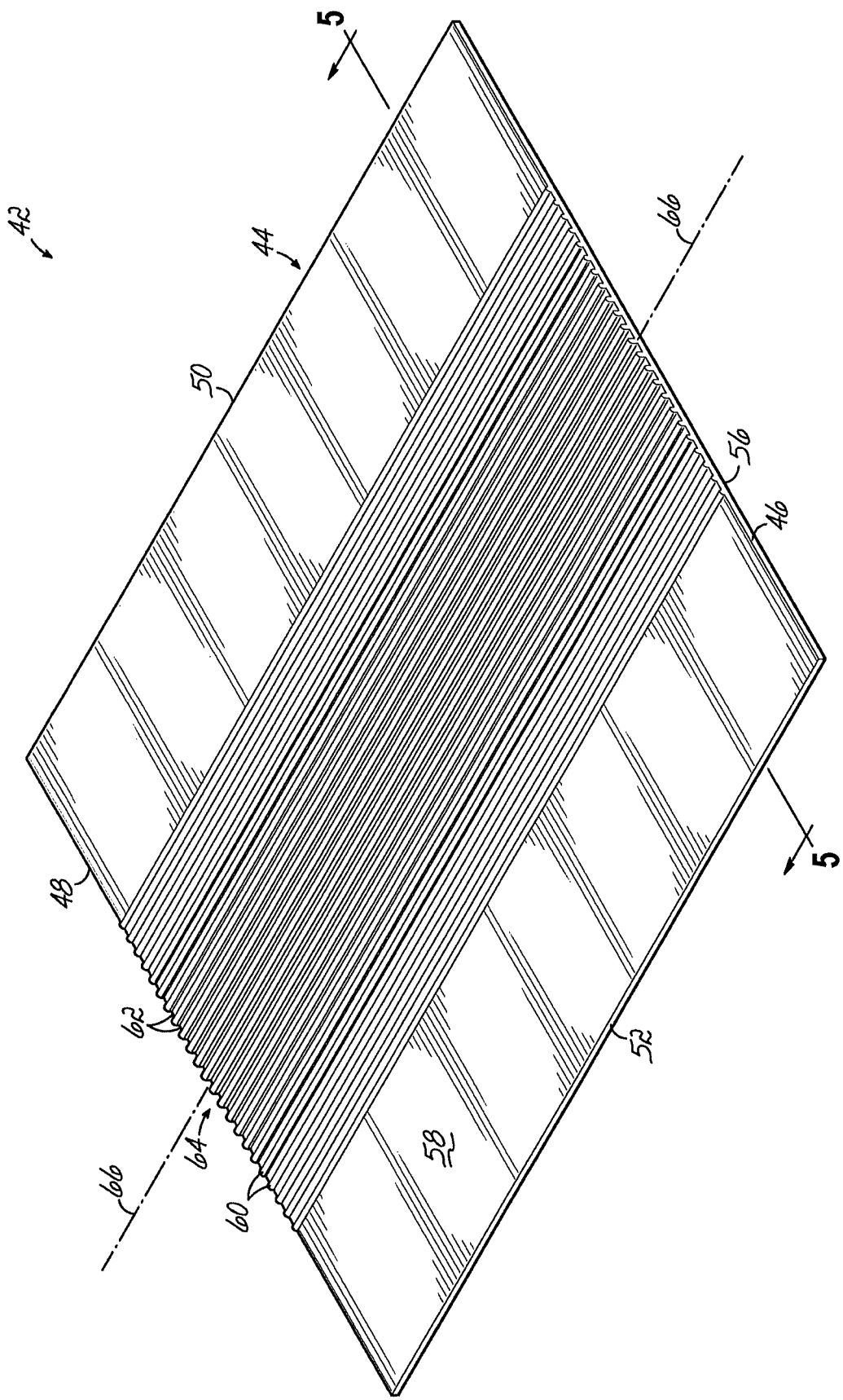
FIG. 4 is a perspective view of a spatula of an applicator tool.
Figure 5:
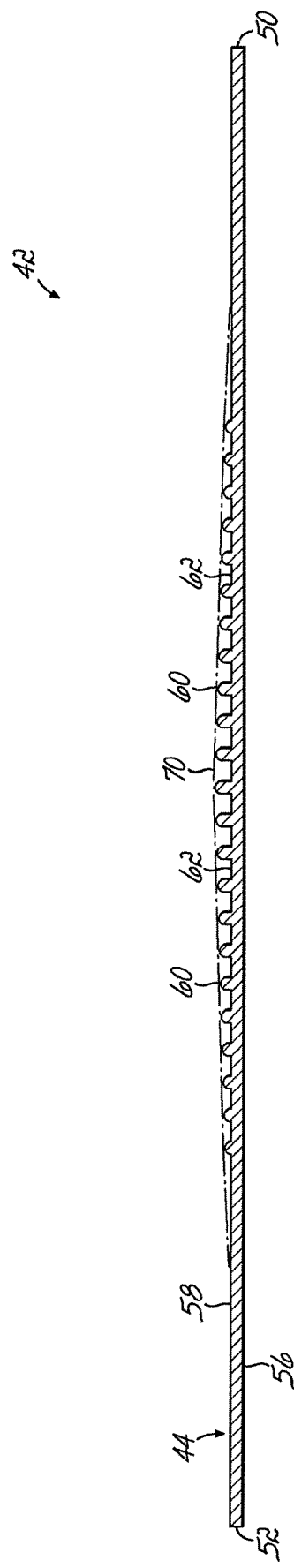
FIG. 5 is a front elevation view of the spatula shown in FIG. 4.

FIGS. 4-9 illustrate an applicator tool 40 in accordance with one example. In accordance with this example, the applicator tool 40 includes a spatula 42 for shaping the coating 30 applied to the leading edge 22 of the wind turbine blade 20. Details of the spatula 42 are illustrated in FIGS. 4 and 5. In an example, the spatula 42 may include a generally flexible or bendable extrusion plate 44 made from, for example, rubber or other generally flexible engineering plastics. The extrusion plate 44 may be generally rectangular in shape and include a front edge 46, a rear edge 48, and opposed side edges 50, 52 that extend between the front and rear edges 46, 48. The extrusion plate 44 may further include an outer surface 56 and an inner surface 58 of the spatula 42. The outer surface 56 is configured to face away from the leading edge 22 of the wind turbine blade 20 during use and the inner surface 58 is configured to face toward the leading edge 22 of the blade 20 during use (see FIGS. 7 and 9). In an example, the extrusion plate 44 may be about 1 millimetre (mm) to about 2 mm in thickness between the outer and inner surfaces 56, 58. More preferably, the extrusion plate 44 may be about 1.5 mm in thickness. Other thickness values, however, may be possible depending on the particular application. The extrusion plate 44 may be formed from a low-friction material or include a coating, such as a polytetrafluoroethylene coating, that provides at least the inner surface 58 with low-friction characteristics.

In an example, the spatula 42 may include a spacer to provide a gap between the outer surface 34 of the blade 20 and the inner surface 58 of the extrusion plate 44. In this example, the spacer may include a plurality of ribs 60 disposed beneath the inner surface 58 of the extrusion plate 44. In one example, the plurality of ribs 60 may extend from the inner surface 58 of the extrusion plate 44 of the spatula 42 in a spaced-apart manner. The ribs 60 may be generally parallel to each other and extend from the front edge 46 and toward the rear edge 48 of the extrusion plate 44. In one example, the plurality of ribs 60 extends all the way to the rear edge 48 of the extrusion plate 44 (FIG. 4). In an alternative example, however, the plurality of ribs 60 stops short of the rear edge 48 of the extrusion plate 44 (not shown). The plurality of ribs 60 may extend away from the front edge 46 and along the inner surface 58 substantially perpendicular to the front edge 46 of the extrusion plate 44. The substantially right angle between the front edge 46 and the plurality of ribs 60 is merely exemplary and other angles may be possible in alternative examples.

The plurality of ribs 60 are spaced apart from each other to define grooves 62 between adjacent ribs 60. The grooves 62 are formed by side surfaces of adjacent ribs 60 and a section of the inner surface 58 of the extrusion plate 44 between the adjacent ribs 60. In an example, the plurality of ribs 60 are uniformly spaced apart from each other by a fixed distance. By way of example and without limitation, the ribs 60 may be spaced from each other between about 3 mm and about 8 mm. More preferably, the ribs 60 may be spaced from each other about 5 mm. Other values, however, remain possible and remain within the scope of the present invention. In an alternative example, the spacing between the ribs 60 may be non-uniform across the width of the spatula 42 (not shown). For example, the spacing between adjacent ribs 60 may be at a minimum adjacent a central region 64 of the spatula 42, as generally defined by an area about a central axis 66, and increase in a direction toward the side edges 50, 52 of the extrusion plate 44. In an example, the plurality of ribs 60 may be integrally formed with the extrusion plate 44 such that, for example, the spatula 42 may be formed by a monolithic body. In an alternative example, however, the plurality of ribs 60 may be separately formed and fixedly coupled to the inner surface 58 of the extrusion plate 44 of the spatula 42. The plurality of ribs 60 may also be made from a low-friction material or be coated with a low-friction material.

As will be explained in detail below, the applicator tool 40 may be moved along the leading edge 22 of the wind turbine blade 20 to apply the coating 30 to the blade 20. In this regard, the spatula 42 is configured to engage with the wind turbine blade 20 and extrude coating material applied to the blade 20 immediately behind of the spatula 42 such that after the spatula 42 passes over the deposited coating material, the coating 30 has the desired smoothness and shape, such as that described above. As noted above, the plurality of ribs 60 are configured to operate as spacers so that a gap 68 is provided between the outer surfaces 34 of the wind turbine blade 20 and the inner surface 58 of the extrusion plate 44. The gap 68 generally corresponds to the desired shape of the coating 30, and as the applicator tool 40 is moved along the leading edge 22 of the blade 20, the coating material is essentially extruded from the gap 68 to define the coating 30, as will be explained in more detail below. Thus, it is the plurality of ribs 60 in combination with the extrusion plate 44 that define the shape of the coating 30 on the blade 20. More particularly, it is a height profile 70 (FIG. 5) of the plurality of ribs 60 that generally defines the shape of the coating 30 applied to the leading edge 22 of the blade 20.

In an example, the height profile 70 defined by the plurality of ribs 60 may be configured to have a maximum height in the central region 64 of the extrusion plate 44 and decreases in height away from the central region 64 and towards the side edges 50, 52 of the extrusion plate 44. In a preferred example, the height of the ribs 60 decay to substantially zero in a direction away from the central region 64 and toward the side edges 50, 52 of the extrusion plate 44. The height profile 70 may have a wide range of configurations such that the height is a maximum near the central region 64 and then decays to substantially zero near the side edges 50, 52. For example, the region of maximum height in the height profile 70 may extend over several of the ribs 60 (e.g., 3, 5, or 7 ribs) in the central region 64, and then start decreasing in height outside of this region. Moreover, the decrease in the rib height may have different configurations. For example, the rib height may decrease from the maximum height in the central region 64 to substantially zero in a linear, parabolic, or exponential fashion. Other decaying configurations may also be possible. In any event, the height profile 70 of the plurality of ribs 60 operates to define generally the cross-sectional shape of the coating 30 applied to the wind turbine blade 20. In one example, a plurality of spatulas 42 may be provided wherein each spatula 42 will have a different height profile 70. Thus, the particular height profile 70 may be selected based on the needs or desires of the coating 30 for a particular application. In an example, the height profile 70 of the plurality of ribs 60 is preferably substantially symmetric about the central axis 66 of the extrusion plate 44 such that the resulting coating 30 is substantially symmetric about the leading edge 22 of the blade 20.

Figure 6:
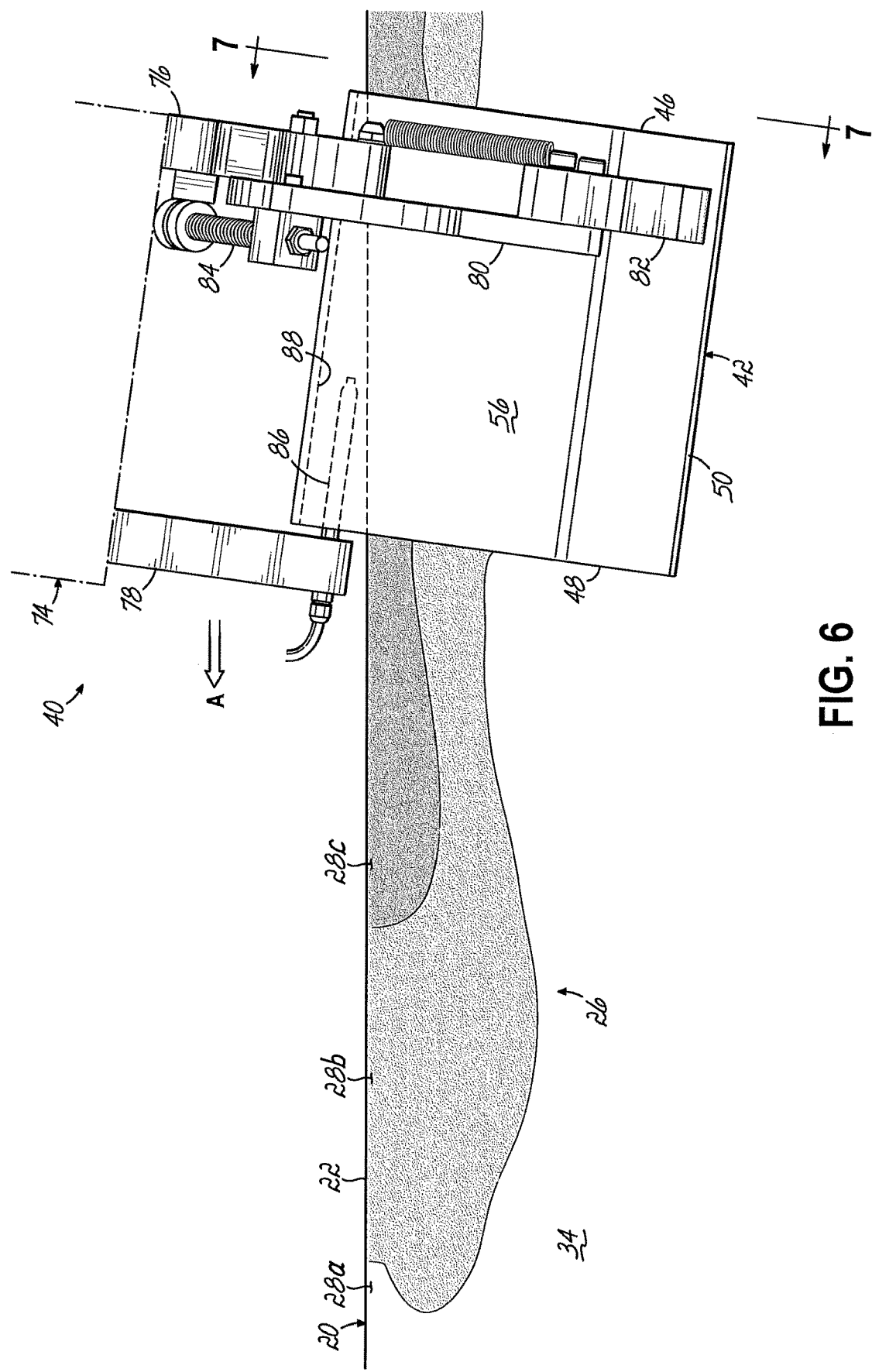
FIG. 6 is a side elevation view of an applicator tool with the spatula of FIG. 4 being used to repair damage to the leading edge of the wind turbine blade.
Figure 7:
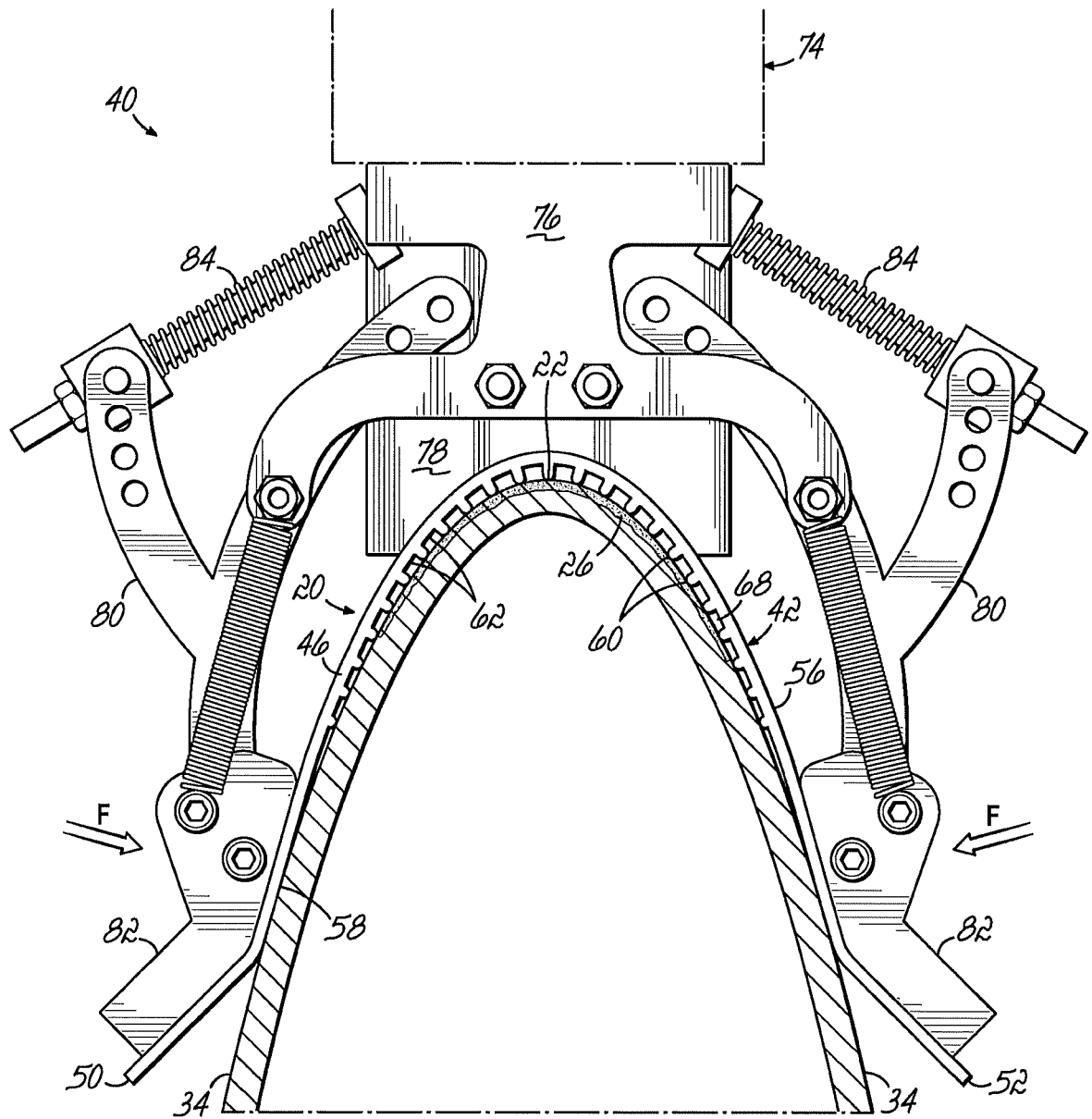
FIG. 7 is a cross-sectional view through the arrangement shown in FIG. 6 taken generally along line 7-7.
Figure 8:
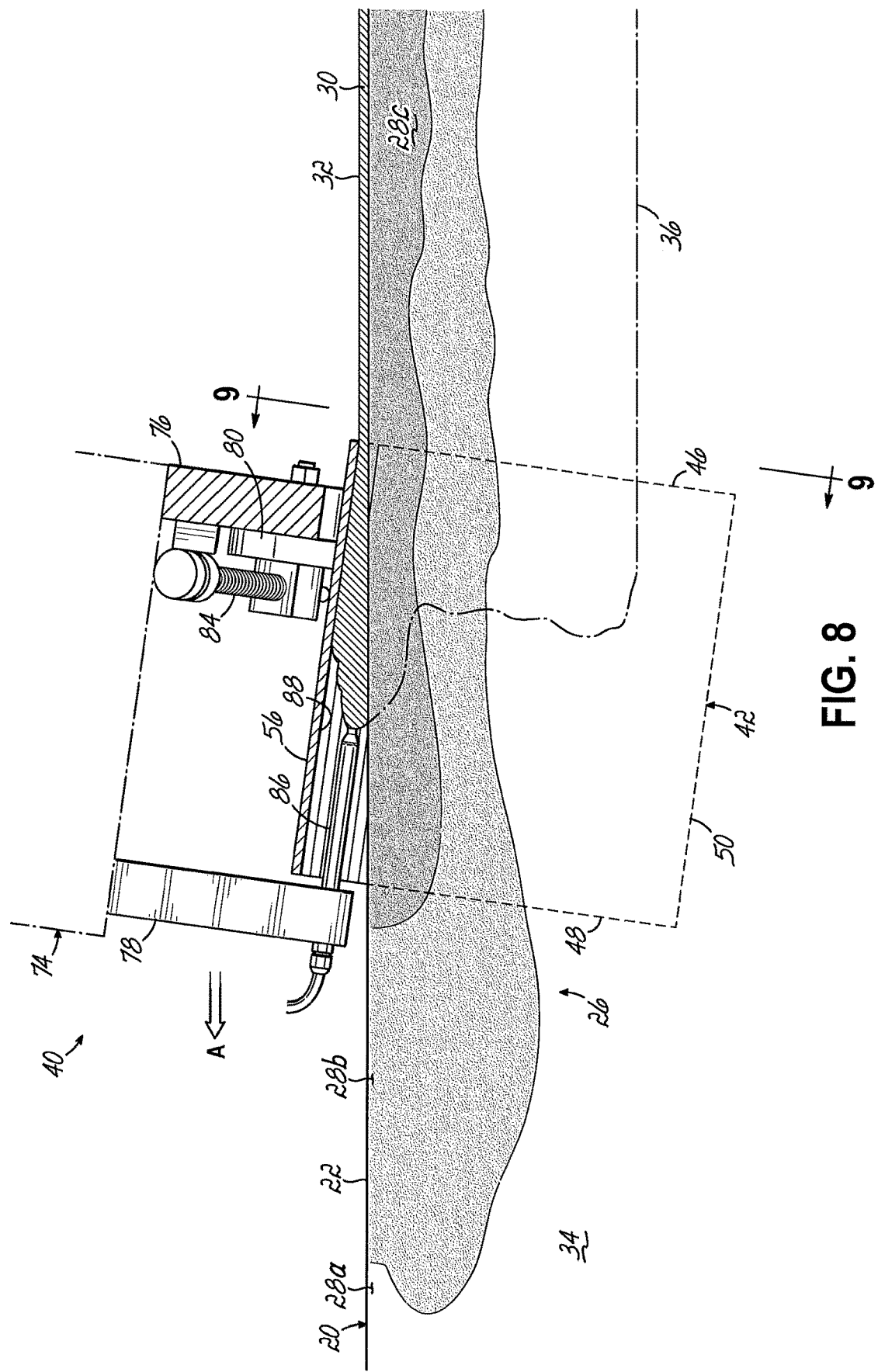
FIG. 8 is another cross-sectional view of the arrangement shown in FIG. 6.
Figure 9:
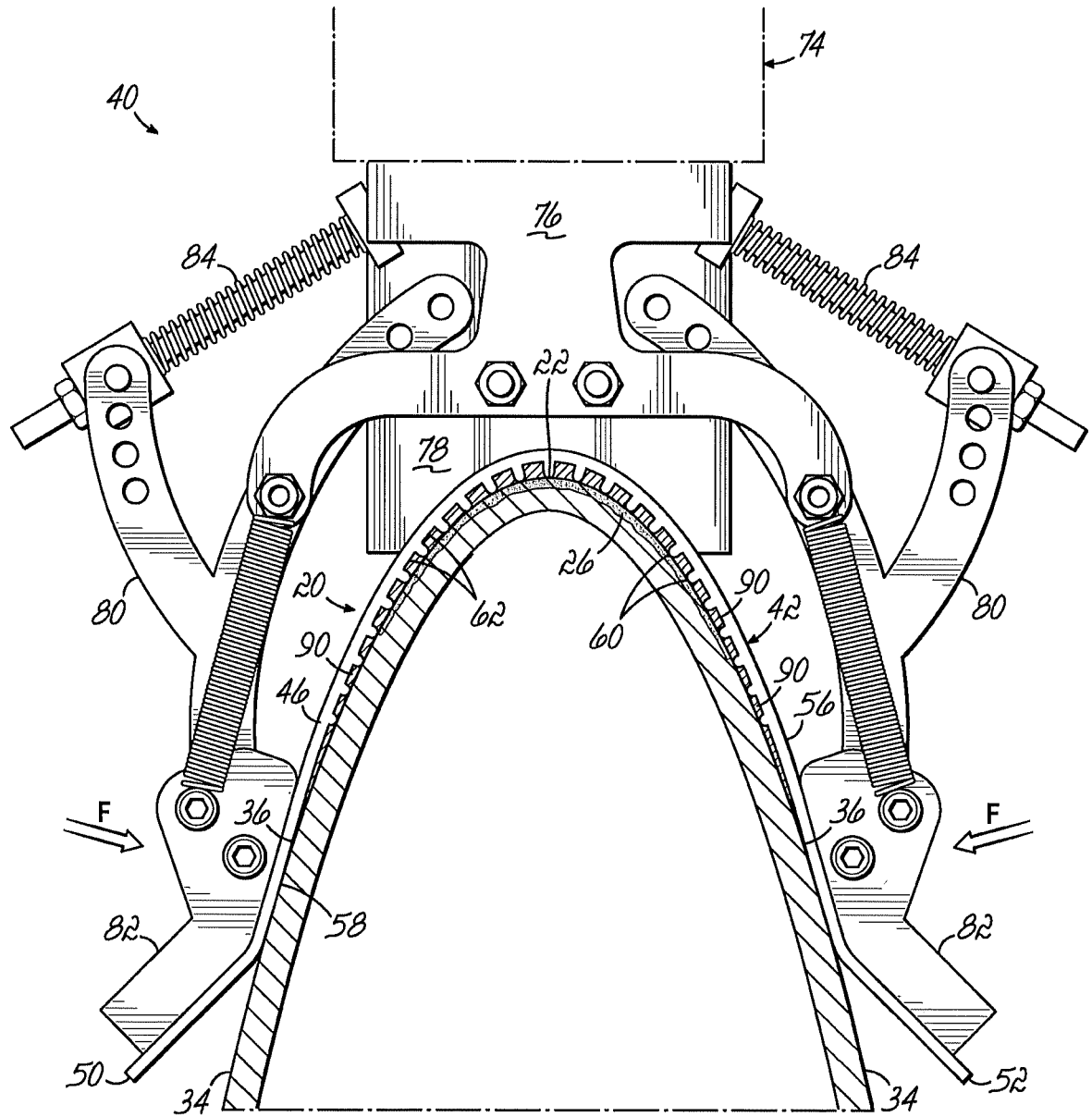
FIG. 9 is a cross-sectional view through the arrangement shown in FIG. 8 taken generally along line 9-9.

FIGS. 6-9 illustrate the use of the applicator tool 40 for making a repair to the leading edge 22 of the wind turbine blade 20 in greater detail. The applicator tool 40 generally includes a frame 74 having a front support 76 and a rear support 78. The front support 76 includes a pair of arms 80 that terminate in respective compression pads 82. One or more springs 84 or other biasing mechanisms may be coupled to the arms 80 and/or pads 82 for pressing the spatula 42 against the outer surface 34 of the wind turbine blade 20 as indicated by arrows F. The rear support 78 may include a feed tube 86 that is operatively coupled (e.g., such as by a pump or the like) to a source of coating material (not shown) and is configured to supply the coating material onto the outer surface 34 of the wind turbine blade 20. The spatula 42 may be positioned on the frame 74 so as to be supported by the front and rear supports 76, 78. For example, the compression pads 82 may be adhered or otherwise selectively and removably coupled to the outer surface 56 of the extrusion plate 44 adjacent the front edge 46 and side edges 50, 52 of the spatula 42. Moreover, the central region 64 of the spatula 42 adjacent the rear edge 48 may be supported by rear support 78 such as with a tab, hook or possibly by the feed tube 86. The feed tube 86 is generally positioned beneath the spatula 42. As illustrated in FIGS. 6 and 8, the frame 74 or the spatula 42 may be angled relative to the leading edge 22 of the blade 20 such that the rear edge 48 of the spatula 42 is above the blade 20 a greater distance than the front edge 46 of the spatula 42. This defines a funnel-shaped space 88 between the blade 20 and the spatula 42 wherein the area between the blade 20 and the spatula 42 decreases in a direction toward the front edge 46 of the spatula 42. The feed tube 86 is configured to extend into the funnel-shaped space 88 and deliver the coating material within this space to form the coating 30.

As illustrated in FIGS. 6-9, to effectuate maintenance and repair of damage 26 on the leading edge 22 of the wind turbine blade 20, the applicator tool 40 may be positioned on the blade 20 such that the plurality of ribs 60 confront the surface 34 of the blade 20 and the ends of the ribs 60 engage the outer surface 34 of the blade 20. The compression pads 82 may press the spatula 42 against the outer surfaces 34 of the blade 20 at some distance from the leading edge 22. Moreover, the central axis 66 of the extrusion plate 44 may be configured to be aligned with the leading edge 22 of the blade 20. This arrangement is shown, for example, in FIGS. 7 and 9. The coating material may then be directed to the feed tube 86 for deposit in the funnel-shaped space 88 between the surface 34 of the blade 20 and the spatula 42. This is illustrated, for example, in FIG. 8.

As the coating material fills the funnel-shaped space 88, the applicator tool 40 may be moved along the leading edge 22 of the blade 20 as demonstrated by arrow A in FIGS. 6 and 8. As the applicator tool 40 moves, the coating material is forced into the funnel toward the front edge 46 of the spatula 42 and is essentially extruded from the grooves 62 at the front edge 46 of the extrusion plate 44. In this example, the coating material is applied to the outer surface 34 of the blade 20 in strips 90 separated from each other due to the presence of the ribs 60 at the front edge 46 of the extrusion plate 44. The height of the strips 90 is dictated by the height profile 70 of the spatula 42. After the coating material is applied to the outer surface 34 of the wind turbine blade 20 in strips 90, the coating material flows under the influence of gravity, surface tension, or other effects to form a smooth and continuous coating 30 having a profile dictated by the height profile 70 of the spatula 42 (e.g., see FIG. 3). In this example, the coating material must be generally flowable (i.e., having a suitable viscosity) that allows the coating material to merge together to form the continuous coating 30 but without having the material simply flow uncontrollably over the outer surface 34 of the blade 20, as might happen with a coating material with a too low of a viscosity. It should be understood that after the coating 30 has dried or cured, the applicator tool 40 may be used to make additional passes over the damage 26 on the leading edge 22 of the blade 20. In this way, the final coating 30 may be comprised of a plurality of layers, with each layer applied using the applicator tool 40 as described above.

FIGS. 10-14 illustrate an applicator tool in accordance with another example. The applicator tool is similar to that described above in that the tool is configured to apply a coating to damage on the leading edge of the wind turbine blade in an improved manner. However, there are a number of distinctions between the applicator tool of this example and that described above that will be highlighted by the following description. By way of example, one difference is the manner in which the coating is applied to the wind turbine blade. More particularly, the applicator tool described above applies strips of the coating material onto the surface of the wind turbine blade as a result of the rib/groove configuration of the spatula. The rib/groove configuration of the spatula is, in turn, a consequence of defining the height profile of the spatula, which ultimately defines the shape of the coating on the blade. In any event, after the strips are applied to the blade, the coating material has to possess a suitable viscosity that allows the material to flow under the influence of gravity and surface tension effects to form a smooth and continuous coating.

The applicator tool in an alternative example described below, however, is configured to operate in a different way. As described in more detail below, the applicator tool is configured to shape the coating material being extruded from the applicator tool more directly. In other words, the coating material extruded from the applicator tool is in a shape that substantially and more directly corresponds to the final shape of the coating on the leading edge of the wind turbine blade. Thus, the application of the coating material in strips and merging of the strips to form the final coating is avoided with this alternative applicator tool. This distinction may have particular relevance when working with coating materials with a high viscosity, such that the strips of the coating material using the applicator tool described above would not flow together under gravity and other effects to form a smooth and continuous coating on the blade. Thus, the alternative applicator tool described below may be ideally suited for high viscosity coating materials.

Another distinction between the applicator tool described above and the alternative applicator tool below is the ability to more dynamically change the profile of the coating applied to the blade. As discussed above, the profile of the coating is dictated primarily by the height profile of the plurality of ribs on the extrusion plate. Recall that if a different profile is desired, then a different spatula is generally required to provide that new profile. The applicator tool in the alternative example is configured to have some ability to selectively adjust the profile of the coating provided by a pass of the applicator tool along the blade. This adjustable feature as well as other features of the alternative applicator tool will now be described in detail.

The applicator tool 40 includes a spatula 42 for shaping the coating 30 applied to the leading edge 22 of the wind turbine blade 20. In an example, the spatula 42 may include a generally flexible or bendable extrusion plate 44 made from, for example, rubber or other generally flexible engineering plastics. The extrusion plate 44 may be generally rectangular in shape and include a front edge 46, a rear edge 48, and opposed side edges 50, 52 that extend between the front and rear edges 46, 48. The extrusion plate 44 may further include an outer surface 56 and an inner surface 58 of the spatula 42. The outer surface 56 is configured to face away from the leading edge 22 of the wind turbine blade 20 during use and the inner surface 58 is configured to face toward the leading edge 22 of the blade 20 during use (see FIGS. 12 and 14). In an example, the extrusion plate 44 may be about 1 mm to about 2 mm in thickness between the outer and inner surfaces 56, 58. More preferably, the extrusion plate 44 may be about 1.5 mm in thickness. Other thickness values, however, may be possible depending on the particular application.

Similar to the above, the spatula 42 may include one or more spacers to provide a gap between the surface 34 of the blade 20 and the inner surface 58 of the extrusion plate 44. In this example, the one or more spacers may include a rigid blade or spine 106 disposed beneath the inner surface 58 of the extrusion plate 44. Unlike the applicator tool described above, the spine 106 is not integrally formed with the extrusion plate 44 but is a separate element that works in conjunction with the extrusion plate 44 in operation of the applicator tool 40. The spine 106 includes a front edge 108, rear edge 110, upper edge 112 and lower edge 114. In an example, the front edge 108 forms a substantially right angle relative to the upper edge 112 and the lower edge 114 forms an acute angle relative to the upper edge 112 (see FIGS. 11 and 14). For example, the lower edge 114 may be angled between about 15 degrees and about 45 degrees relative to the upper edge 112. As explained in more detail below, the lower edge 114 is configured to engage with the leading edge 22 of the wind turbine blade 20 during use and the configuration of the spine 106 provides a gap between the outer surface 34 of the blade 20 and the inner surface 58 of the extrusion plate 44. The spatula 42 further includes a feed tube 86 that is coupled to the rear edge 110 of the spine 106 at one end thereof and is operatively coupled (such as by a pump or the like) to a source of coating material (not shown) at another end thereof for supplying the coating material onto the outer surface 34 of the wind turbine blade 20. In one example, the spine 106 may be integrally formed with the end of the feed tube 86. In an alternative example, these elements may be separate and subsequently coupled together.

Figure 10:
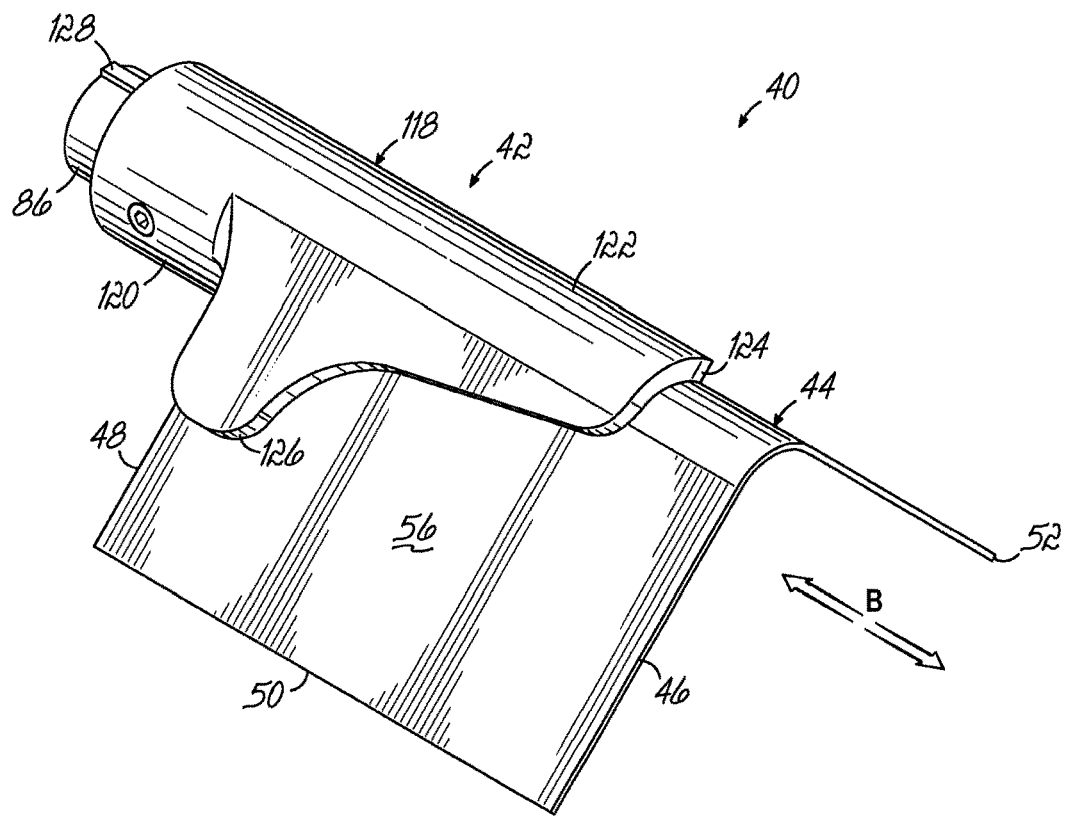
FIG. 10 is a top perspective view of a spatula of an applicator tool.
Figure 11:
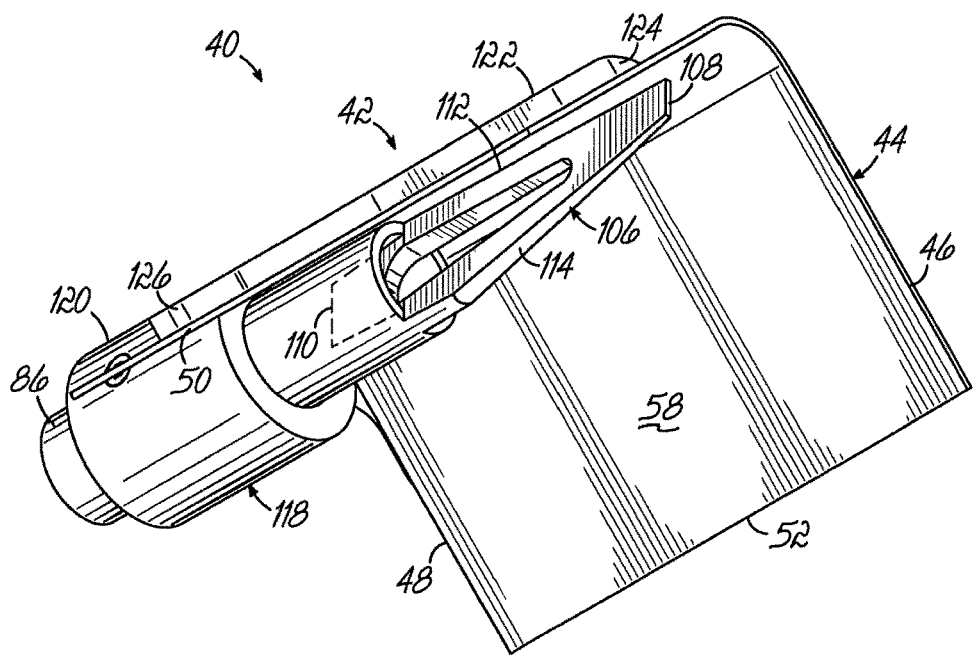
FIG. 11 is a bottom perspective view of the spatula shown in FIG. 10.

The extrusion plate 44 is carried by a rigid support 118 having a tubular portion 120 and a finger 122 coupled to and extending forward of the tubular portion 120. For example, the rigid support 118 may include a tab that is received in a hole in the extrusion plate 44. Other attachment means, however, may be possible. The tubular portion 120 is generally disposed about an end of the feed tube 86 in, for example, a coaxial and telescoping manner. The finger 122 extends from an upper region of the tubular portion 120 and includes a generally arcuate central portion 124 and a pair of wings 126 extending on both sides of the central portion 122. The extrusion plate 44 is coupled to the rigid support 118 and generally disposed between the finger 122 of the support 118 and the spine 106. In an example, the extrusion plate 44 may be movable relative to the spine 106. More particularly, the rigid support 118 is slidable over the feed tube 86, which in turn moves the extrusion plate 44 relative to the spine 106 generally along a direction illustrated by arrows B (FIG. 10). The relative movement between the extrusion plate 44 and the spine 106 (which may be permitted for only a limited distance) allows the height profile of the coating material extruded from the applicator tool 40 to be varied. For example, in a forward position of the extrusion plate 44 relative to the spine 106, the height of the coating material (e.g., at the central axis 66 of the extrusion plate 44) may be at a minimum, and in a rearward position of the extrusion plate 44 relative to the spine 106, the height of the coating material at the central axis of the extrusion plate 44 may be at a maximum. In other words, while the applicator tool 40 is configured to provide a coating 30 similar to that shown in FIG. 3, for example, the thickness of the coating (such as at the leading edge 22 of the blade 20) may be varied depending on the position of the extrusion plate 44 relative to the spine 106. In any event, when the desired thickness of the coating 30 is determined, a set screw may be used to fix the relative positions of the extrusion plate 44 and the spine 106 to thereby fix the thickness of the coating 30 at the leading edge 22, for example. Additionally, the feed tube 86 and the rigid support 118 may have a keying feature 128 (e.g., key and corresponding keyway) to prevent relative rotations between the feed tube 86 and the rigid support 118.

As will be explained in detail below, the applicator tool 40 may be moved along the leading edge 22 of the wind turbine blade 20 to apply the coating 30 to the blade 20. In this regard, the spatula 42 is configured to engage with the wind turbine blade 20 and extrude coating material applied to the blade 20 immediately behind the extrusion plate 44 of the spatula 42 such that after the spatula 42 passes over the deposited coating material, the coating 30 has the desired smoothness and shape. As noted above, the spine 106 is configured to operate as a spacer so that a gap 68 is provided between the outer surfaces 34 of the wind turbine blade 20 and the inner surface 58 of the extrusion plate 44. The gap 68 in this example more directly corresponds to the desired shape of the coating 30, and as the applicator tool 40 is moved along the leading edge 22 of the blade 20, the coating material is essentially extruded from the gap 68 to ultimately define the coating 30, as will be explained in more detail below. Thus, it is the spine 106 in combination with the extrusion plate 44 that defines the shape of the coating 30 on the blade 20. More particularly, it is the position of the extrusion plate 44 relative to the spine 106 that defines a height profile which generally defines the shape of the coating 30 applied to the leading edge 22 of the blade 20.

In an example, the height profile 70 defined by the spine 106 may be configured to have a maximum height in the central region 64 of the extrusion plate 44 and decrease in height away from the central region 64 and towards the side edges 50, 52 of the extrusion plate 44. In a preferred example, there is but a single spine 106 in the central region 64 of the spatula 42. Due to the lack of other spines away from the central region 64, the height profile 70 defined by the spine 106 decays to substantially zero in a direction away from the central region 64 and toward the side edges 50, 52 of the extrusion plate 44. The height profile 70 may have a wide range of configurations such that the height is a maximum near the central region 64 and then decays to substantially zero near the side edges 50, 52. The height profile 70 of provided by the spine 106 operates to define the cross-sectional shape of the coating 30 applied to the wind turbine blade 20. As explained above, the relative position of the extrusion plate 44 and the spine 106 may be adjusted to vary the height profile 70 provided by the spatula 42. The particular height profile 70 may be selected based on the needs or desires of the coating 30 for a particular application. In an example, the height profile 70 provided by the spine 106 is substantially symmetric about the central axis 66 of the extrusion plate 44 such that the resulting coating 30 is substantially symmetric about the leading edge 22 of the blade 20.

As illustrated in FIGS. 12-15, to effectuate maintenance and repair of damage 26 on the leading edge of the wind turbine blade 20, the applicator tool 40 may be positioned on the blade 20 such that the spine 106, and more particularly the lower edge 114 thereof, engages the surface 34 of the blade 20 substantially along the leading edge 22. The applicator tool 40 may further include compression pads 82 or other biasing mechanisms that press the extrusion plate 44 against the outer surfaces 34 of the blade 20 at some distance removed from the leading edge 22. Moreover, the central axis 66 of the spatula 42 may be configured to be aligned with the spine 106 (and leading edge 22 of the blade 20). This arrangement is shown, for example, in FIGS. 13 and 15. The coating material may then be directed to the feed tube 86 for deposit in the funnel-shaped space 88 between the outer surfaces 34 of the blade 20 and the inner surface 58 of the extrusion plate 44. This is illustrated, for example, in FIG. 14.

Figure 12:
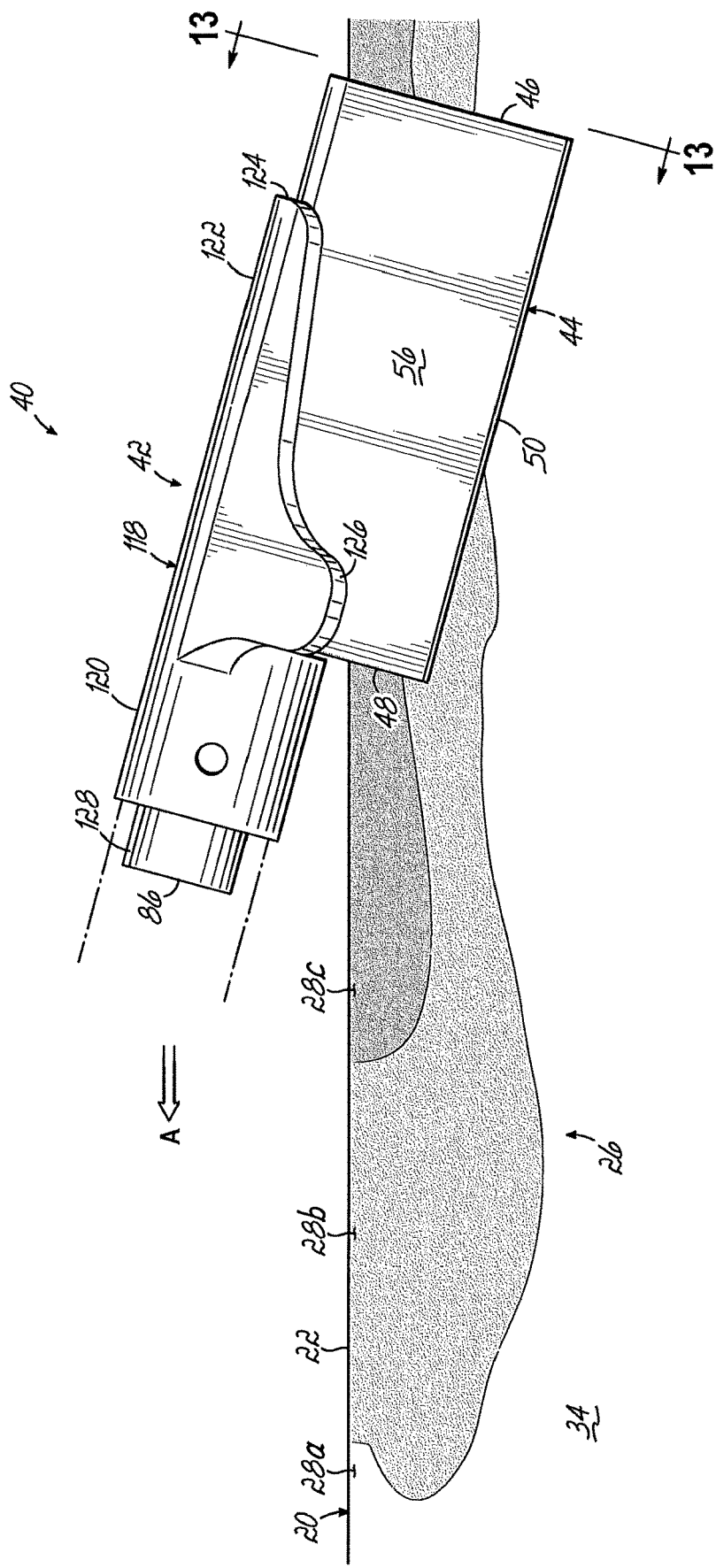
FIG. 12 is a side elevation view of an applicator tool with the spatula of FIG. 10 being used to repair damage to the leading edge of the wind turbine blade.
Figure 13:
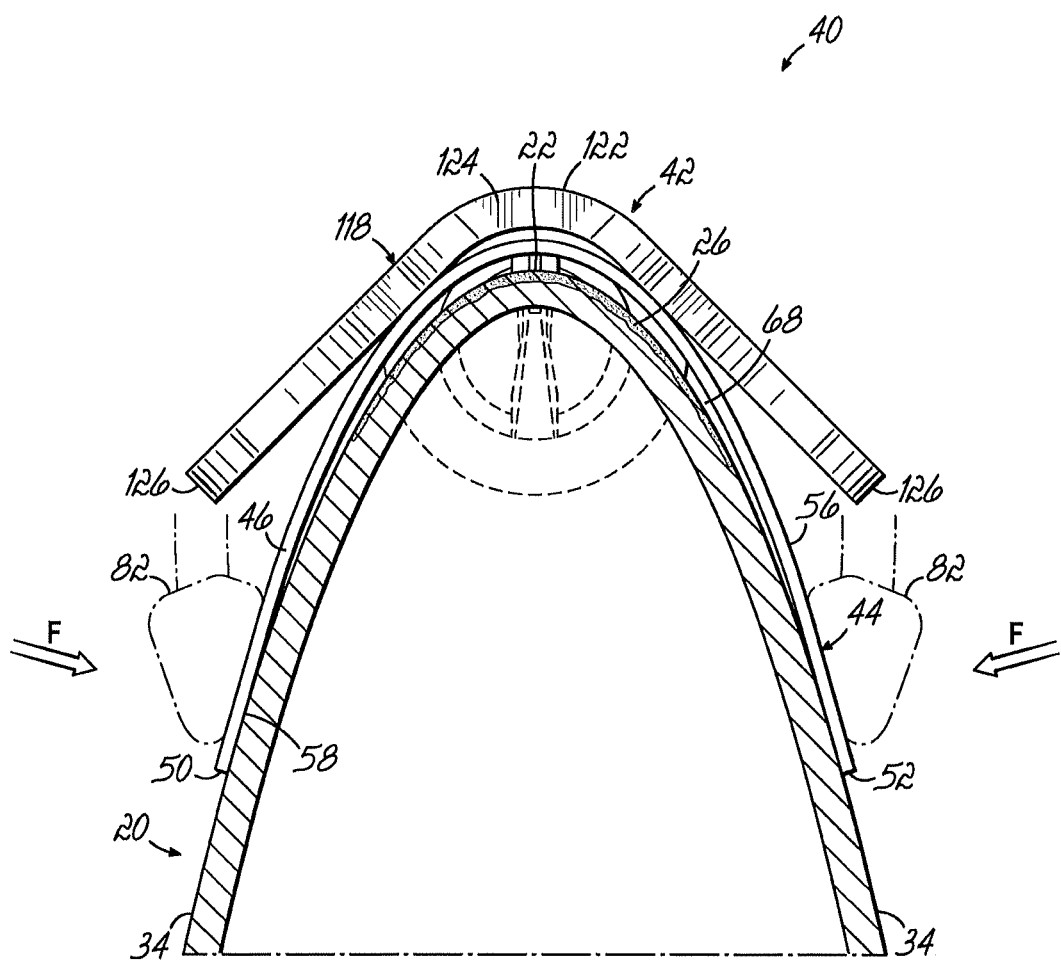
FIG. 13 is a cross-sectional view of the arrangement shown in FIG. 12 taken generally along line 13-13.
Figure 14:
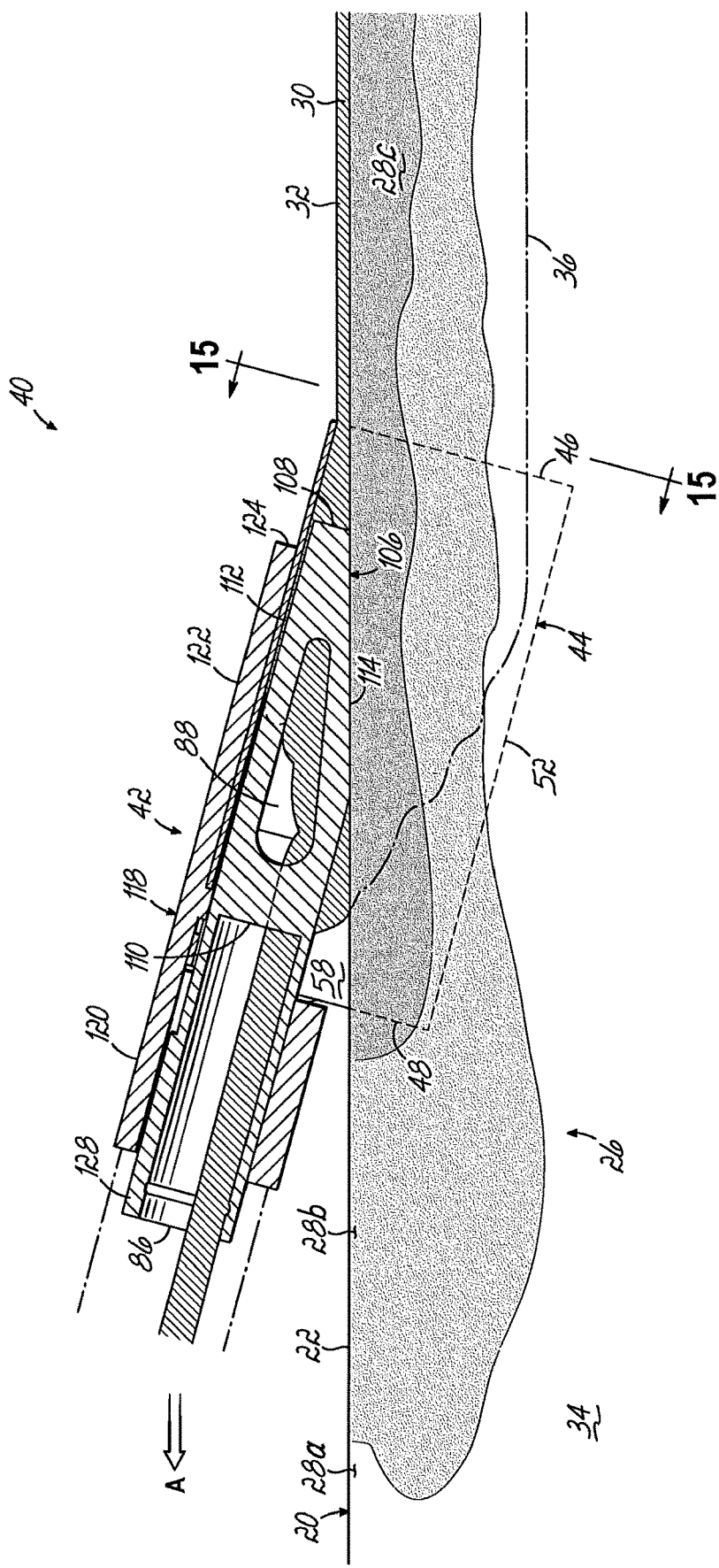
FIG. 14 is another cross-sectional view through the arrangement shown in FIG. 12.
Figure 15:
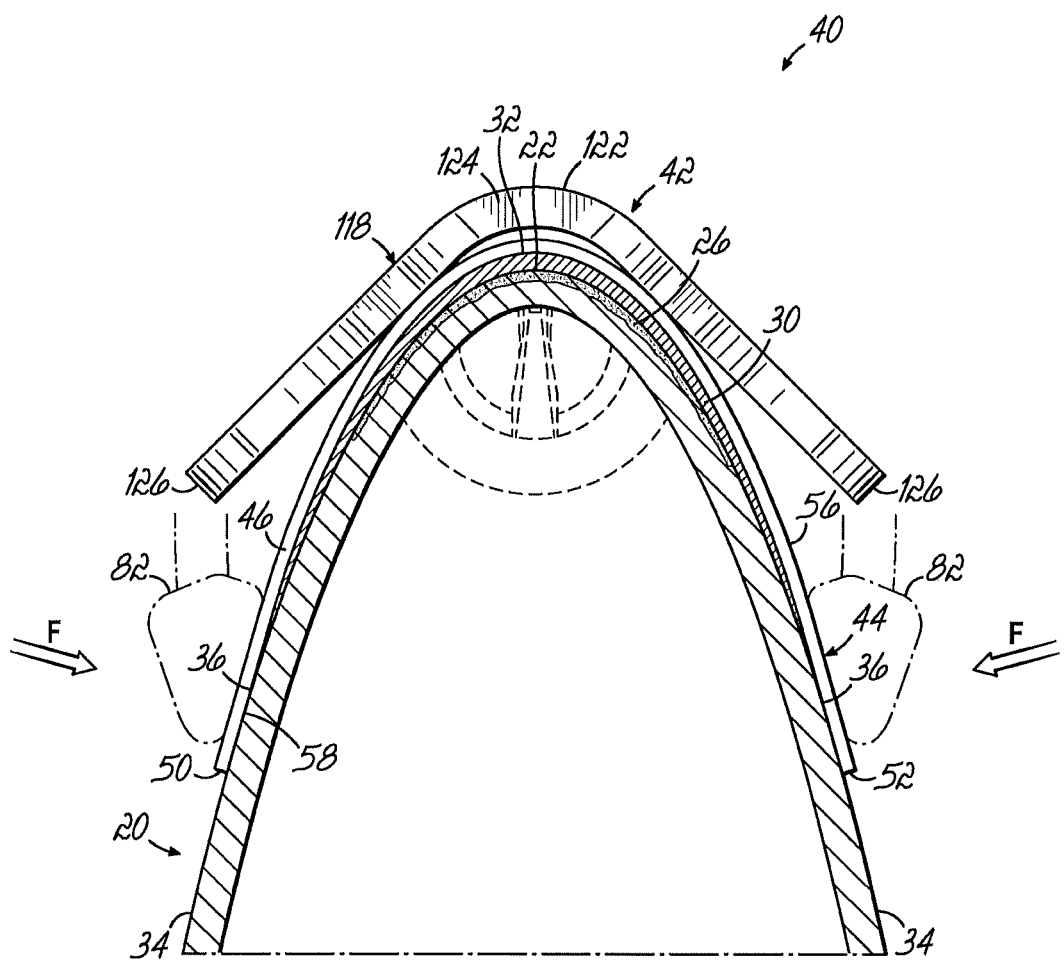
FIG. 15 is a cross-sectional view through the arrangement shown in FIG. 14 taken generally along line 15-15.

As the coating material fills the funnel-shaped space 88, the applicator tool 40 may be moved along the leading edge 22 of the blade 20 as demonstrated by arrow A in FIGS. 12 and 14. As the applicator tool 40 moves, the coating material is forced into the funnel toward the front edge 46 of the spatula 42 and is essentially extruded from the front edge 46 of the extrusion plate 44. In this example, the coating material is applied to the outer surfaces 34 of the blade 20 as a whole (e.g., instead of in strips) to form a smooth and continuous coating 30 having a profile that corresponds to the height profile 70 of the spatula 42 (e.g., see FIG. 3). It should be understood that after the coating 30 has dried or cured, the applicator tool 40 may be used to make additional passes over the damage 26 on the leading edge 22 of the blade 20. In this way, the final coating 30 may be comprised of a plurality of layers, with each layer applied using the applicator tool 40 as described above.

Figure 16:
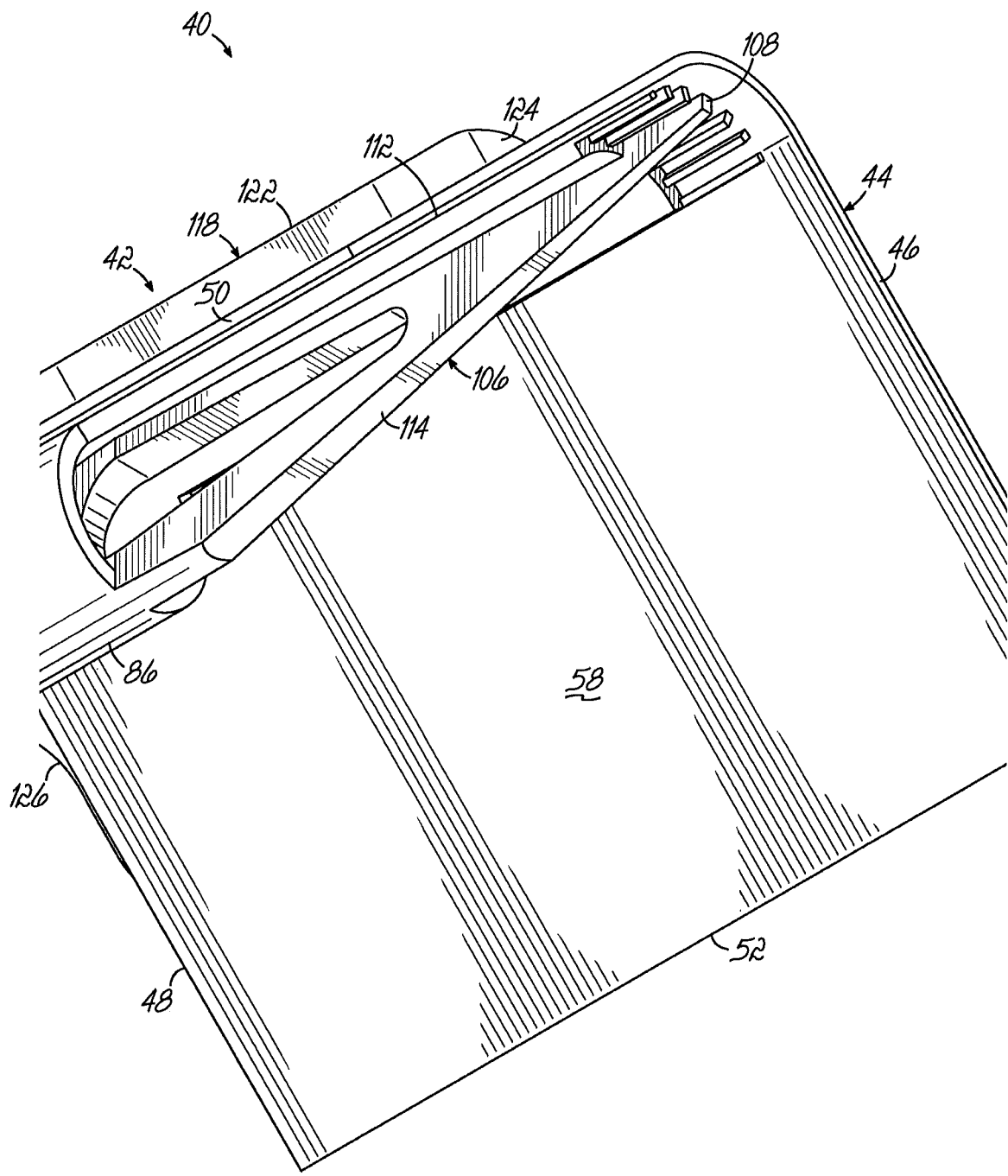
FIG. 16 is a partial perspective view of a spatula of an applicator tool.

FIG. 16 illustrates an applicator tool 40 very similar to that described above. The primary difference is that the spatula 42 includes a plurality of spines 106 instead of a single spine, as described above. The additional spines 106 not only help define the height profile 70, but are also configured to provide stability to the applicator tool 40 as the tool is moving along the leading edge 22 of the wind turbine blade 20. For instance, with a single spine 106, the applicator tool 40 may be susceptible to movements (e.g., slips) away from the leading edge 22 of the blade 20. The plurality of spines 106 now engage the surface 34 of the blade 20 in multiple locations about the leading edge 22, and thereby reduces the likelihood of the applicator tool 40 from slipping away from the leading edge 22 as the applicator tool 40 is moved.

The example of the applicator tool described above improve maintenance and repairs for erosion damage at the leading edge of the wind turbine blade. More particularly, the applicator tool provides an apparatus and method for applying a coating over the damage at the leading edge so as to arrest further deterioration of the wind turbine blade.

Additionally, the applicator tool provides a coating that has an ideal profile, i.e., having a maximum thickness at the leading edge of the blade and then decaying in thickness to substantially zero thickness away from the leading edge so as to smoothly merge into the outer surfaces of the wind turbine blade. The profile provided by the applicator tool minimizes disruptions of the airflow over the blade and any resulting reduction in aerodynamic performance as a result of those disruptions. The applicator tool is particularly advantageous when repairing wind turbine blades in field conditions when, for example, the blades remain attached to the rotor hub at the top of the tower of the wind turbine. Thus, even in less than ideal field conditions, the applicator tool is able to provide a high quality and precise repair of the damaged area of the wind turbine blade.

In addition, the applicator tool may be adapted to be used to repair the leading edge of a wind turbine blade in a variety of ways. In one example, for example, the applicator tools may be adapted to be used manually, such as by an operator that is positioned adjacent to the damage on the blade during the repair process. For example, the operator may have rope access to the blade from, for example, the nacelle of the wind turbine. Alternatively, the operator may be positioned in a platform or the like and the platform positioned adjacent the damaged area of the blade. In any event, the applicator tool is arranged to be manipulated by the operator's hands in order to move the applicator tool along the leading edge of the blade. In an alternative example, the applicator tool may be adapted for use with a robotic maintenance device that is configured to replace the human operator and move the applicator tool along the leading edge of the blade. Exemplary robotic maintenance devices are, for example, disclosed in DK Application Nos. PA 201970789 and PA 201970790, which are owned by the same Assignee as the present invention and incorporated by reference herein in their entirety. Accordingly, a further description of such robotic maintenance devices will not be provided herein.

While the present invention has been illustrated by a description of various preferred examples and while these examples have been described in some detail, it is not the intention of the Applicant to restrict or in any way limit the scope of the appended claims to such detail. Additional advantages and modifications will readily appear to those skilled in the art. Thus, the various features of the invention may be used alone or in any combination depending on the needs and preferences of the user.

The invention claimed is:

1. An applicator tool for repairing damage to a wind turbine blade, comprising:
   a spatula comprising:
      a flexible extrusion plate having a front edge, a rear edge, opposed side edges, an outer surface, and an inner surface, the extrusion plate further having a central region defined by a central axis; and
      one or more spacers positioned proximate the inner surface of the extrusion plate, wherein the one or more spacers are configured to define a gap between an outer surface of the wind turbine blade and the inner surface of the extrusion plate; and
   a feed tube for supplying a coating material to the spatula, wherein the spatula is configured to shape the coating material into a coating over a damaged area of the wind turbine blade.

2. The applicator tool according to claim 1, wherein the one or more spacers define a height profile that corresponds to the shape of the coating from the applicator tool.

3. The applicator tool according to claim 2, wherein the height profile has a maximum adjacent the central region of the extrusion plate and decays to substantially zero adjacent the side edges of the extrusion plate.

4. The applicator tool according to claim 1, wherein the extrusion plate is selectively movable relative to the one or more spacers.

5. The applicator tool according to claim 4, wherein relative movement between the extrusion plate and the one or more spacers varies a height profile of the one or more spacers.

6. The applicator tool according to claim 1, wherein the one or more spacers include a plurality of ribs coupled to the inner surface of the extrusion plate and extending from the front edge toward the rear edge, and wherein the plurality of ribs defines grooves between adjacent ribs.

7. The applicator tool according to claim 6, wherein the plurality of ribs is integrally formed with the extrusion plate.

8. The applicator tool according to claim 6, wherein the plurality of ribs is positioned on the inner surface of the extrusion plate about the central region, and wherein regions of the inner surface adjacent the side edges are void of the plurality of ribs.

9. The applicator tool according to claim 6, wherein a height of the plurality of ribs varies.

10. The applicator tool according to claim 9, wherein the height of the plurality of ribs is at a maximum adjacent the central region of the extrusion plate and decreases in height away from the central region and toward the side edges.

11. The applicator tool according to claim 6, wherein the plurality of ribs is symmetric about the central axis.

12. The applicator tool according to claim 1, wherein the one or more spacers include one or more spines having a front edge, a rear edge, an upper edge, and a lower edge.

13. The applicator tool according to claim 12, wherein the lower edge is angled relative to the upper edge by an acute angle, and wherein the lower edge is configured to engage the outer surface of the wind turbine blade.

14. The applicator tool according to claim 12, wherein the one or more spines is separate from the extrusion plate.

15. The applicator tool according to claim 12, wherein the one or more spines is positioned proximate the inner surface of the extrusion plate about the central region, and wherein the one or more spines extends in a direction generally parallel to the central axis.

16. The applicator tool according to claim 12, wherein the extrusion plate is coupled to a rigid support, wherein the one or more spines is coupled to the feed tube, and wherein the rigid support is slidable relative to the feed tube.

17. A method of repairing damage to a wind turbine blade, comprising:
providing an applicator tool according to claim 1;
engaging the applicator tool to the outer surface of the wind turbine blade;
supplying the coating material to the applicator tool;
moving the applicator tool along the outer surface of the wind turbine blade; and
dispensing the coating material from the applicator tool to form the coating over the damaged area of the wind turbine blade.

18. The method according to claim 17, wherein engaging the applicator tool further comprises engaging the applicator tool to a leading edge of the wind turbine blade.

19. The method according to claim 17, wherein supplying the coating material further comprises supplying the coating material to a funnel-shaped space between the outer surface of the wind turbine blade and the inner surface of the extrusion plate.

20. The method according to claim 17, wherein moving the applicator tool further comprises manually moving the applicator tool along the outer surface of the wind turbine blade or moving the applicator tool along the outer surface of the wind turbine blade using a robotic device.

21. The method according to claim 17, wherein dispensing the coating material further comprises dispensing the coating material onto the outer surface of the wind turbine blade in strips, and wherein the strips merge together to form the coating.

22. The method of claim 17, wherein the applicator tool is configured to dispense the coating material to form a coating having a first profile, the method further comprising reconfiguring the applicator tool to dispense the coating material to form a coating having a second profile different from the first profile.

23. The method of claim 22, wherein reconfiguring the applicator tool further comprises:
removing the spatula from the applicator tool; and
inserting another spatula into the applicator tool.

24. The method of claim 22, wherein reconfiguring the applicator tool further comprises selectively moving the extrusion plate relative to the one or more spacers.

* * * * *